US011105470B2

(12) United States Patent
Kang et al.

(10) Patent No.: US 11,105,470 B2
(45) Date of Patent: Aug. 31, 2021

(54) METHOD FOR DETERMINING LOSS OF GAS IN GAS CONTAINER

(71) Applicant: KOREA RESEARCH INSTITUTE OF STANDARDS AND SCIENCE, Daejeon (KR)

(72) Inventors: Nam Goo Kang, Daejeon (KR); Sang Hyub Oh, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 153 days.

(21) Appl. No.: 16/477,017

(22) PCT Filed: Jan. 16, 2018

(86) PCT No.: PCT/KR2018/000717
§ 371 (c)(1),
(2) Date: Jul. 10, 2019

(87) PCT Pub. No.: WO2018/143579
PCT Pub. Date: Aug. 9, 2018

(65) Prior Publication Data
US 2021/0025549 A1    Jan. 28, 2021

(30) Foreign Application Priority Data
Jan. 31, 2017   (KR) .......................... 10-2017-0014026

(51) Int. Cl.
*F17C 13/02*   (2006.01)
*G01F 1/34*    (2006.01)

(52) U.S. Cl.
CPC ............... *F17C 13/02* (2013.01); *G01F 1/34* (2013.01)

(58) Field of Classification Search
CPC .............................. F17C 13/02; F17C 13/028; F17C 2250/0621; G01F 1/34; G01F 17/00; G01N 15/0893
See application file for complete search history.

(56) References Cited

U.S. PATENT DOCUMENTS 6,306,349 B1 * 10/2001 Moon ................ G01N 15/0893
422/69

FOREIGN PATENT DOCUMENTS

| JP | 10-142136 A   | 5/1998 |
| JP | 2005-049354 A | 2/2005 |

(Continued)

OTHER PUBLICATIONS

Lee et al., "Determining of Physical Adsorption Loss of Primary Standard Gas Mixtures in Cylinders using Cylinder-to-Cylinder Division", Dec. 2017, IOP Publishing, Metrologia, vol. 54, Issue 6, p. L26-33.*

*Primary Examiner* — Manuel L Barbee
(74) *Attorney, Agent, or Firm* — Stuart H. Mayer; Mayer & Williams PC

(57) ABSTRACT

The present invention relates to a method for determining loss of gas in a gas container. According to an embodiment of the present invention, the method for determining the loss of gas in the gas container is characterized by including the steps of (a) filling a first container (10) with a component gas and a balance gas, (b) measuring a gas pressure inside the first gas container (11), (c) allowing the first gas container and a second gas container having an evacuated inside to communicate and performing a first-stage gas pressure split, and (d) measuring a gas pressure inside the second gas container, wherein an amount of the component gas adsorbed inside the gas container is calculated through a difference between a measured value of step (b) and a measured value of step (d) and is determined as an amount of gas loss.

14 Claims, 2 Drawing Sheets

(a)

(b)

(56) References Cited

FOREIGN PATENT DOCUMENTS

| | | | |
|---|---|---|---|
| JP | 2010-048572 | A | 3/2010 |
| JP | 2013-238444 | A | 11/2013 |
| KR | 10-2010-0064858 | A | 6/2010 |

* cited by examiner

METHOD FOR DETERMINING LOSS OF GAS IN GAS CONTAINER

TECHNICAL FIELD

The present invention relates to a method for determining the amount of gas loss in a gas container. More specifically, the present invention relates to a method which is for determining the amount of gas loss in a gas container caused by a gas distribution process and with which the amount of gas lost due to adsorption or reaction of the gas can be determined.

BACKGROUND ART

In processes of transferring and using process gases in various industrial fields, it is utmost important to control the supply of a suitable amount of process gases. In particular, in the fields of semiconductor thin film processes and the like in which uniform and slight gas flow should be controlled, when supplying a smaller amount of gas than that expected because the process gas is lost during the process, there may be limitations in that the characteristics of a semiconductor product is adversely affected.

Furthermore, when performing gas distribution in a petrochemical process fields or the like in which the flow of gas should be uniformly controlled, the operation of injecting a proper amount of gas and determining the concentration of the gas is important. In this case, the amount lost through the gas distribution process is non-negligible, and when supplying a gas less than an expected value, a limitation of adversely affecting the characteristics of the final product may occur.

The present invention provides a method for preventing the loss of a process gas, wherein a sealing means is interposed in pipes, chambers, or the like, or a leakage blocking device or the like is used such that the process gas does not leak to the outside during transfer of the process gas or during a process. Alternatively, a method is provided in which an internal heater or the like is used so as to prevent the occurrence of condensation or reaction on inner surfaces of pipes, chambers or the like during a transfer of a process gas or during a process.

Meanwhile, in controlling the flow rate of the process gas, it is also necessary to consider that the process gas is instantaneously adsorbed to inner surfaces of pipes, chambers, or the like or is lost due to a latent reaction with impurities included in the inner surfaces. A qualitative guideline of suitability for selecting a material of a transfer line corresponding to the most frequently used gas species is partially suggested in ISO16664:2004 Table 1 and the like.

DISCLOSURE OF THE INVENTION

Technical Problem

However, there is a lack of guidelines for other gas species besides the frequently used gas species. In particular, there is a lack of a technique for precisely measuring the instantaneous loss of process gas generated at the instant of filling the process gas into a high-pressure container due to adsorption property and reactivity inside a container. In addition, there is no determined mathematical method that is capable of determining the amount of process gas loss due to loss inside various equipment (containers, conduits, reactors, valves, etc.) that supplies process gases such as high molecular weight energy gases, raw material gases, liquid gases, and adsorptive gases via a gas distribution process.

The purpose of the present invention is to solve various limitations including the above limitations, and the present invention provides a method for determining the amount of process gas loss that may be lost by being adsorbed to or reacted with the inside of a high-pressure gas container.

In addition, the purpose of the present invention is to provide a mathematical method for determining the amount of process gas loss due to a loss inside various equipment for injecting a process gas.

However, the above purposes are merely illustrative, and the scope of the present invention is not limited thereto.

Technical Solution

According to an aspect of the present invention for solving the above problems, there is provided a method for determining a process gas loss in a gas container, the method including the steps of: (a) filling a component gas and a balance gas into a first gas container; (b) measuring a gas pressure inside the first gas container; (c) performing a first-stage gas pressure split by allowing the first gas container to communicate with a second gas container having an evacuated inside; and (d) measuring a gas pressure inside the second gas container, wherein an amount of the component gas adsorbed inside the gas container is calculated through a difference between a measured value of step (b) and a measured value of step (d) and is determined as an amount of gas loss.

In addition, according to an embodiment of the present invention, the amount of the component gas adsorbed inside the gas container may be determined by converting the difference between the pressure values measured in steps (b) and (c) into the number of moles of the component gas.

In addition, according to an embodiment of the present invention, when the measured value of step (b) is $P_{m,gas,0}$, and the measured value of step (d) is $P_{d,gas,1}$, an amount $n_{A,loss,m,0}$ of the adsorbed component gas may be determined by formula (1)

$$\frac{1}{2}P_{m,gas,0} - P_{d,gas,1} = \frac{1}{2}\frac{Z_A RT}{V_{cyl}}n_{A,loss,m,0}$$

($Z_A$ is a compression factor, R is the gas constant, T is a temperature, and $V_{cyl}$ is a gas container internal volume).

In addition, according to an embodiment of the present invention, when a manufacturing input amount of the component gas in step (a) is $n_{A,grav,m,0}$ and a manufacturing input amount of the balance gas is $n_{B,grav,m,0}$ in step (a), and a measured value of the molar fraction of the component gas is $x_{A,gas,d,1}$ in step (d), the amount $n_{A,loss,m,1}$ of loss of the component gas may be determined by formula (2)

$$n_{A,loss,m,1} = \frac{1}{2}\left(n_{A,grav,m,0} - \frac{n_{B,grav,m,0}x_{A,gas,d,1}}{1 - x_{A,gas,d,1}}\right).$$

In addition, according to an embodiment of the present invention, a pressure loss value exhibited by the adsorption of the component gas inside the first gas container in step (b) may be two times a pressure loss value exhibited by the adsorption inside the first gas container and the second gas container after performing the first-stage gas pressure split in step (d).

In addition, according to an embodiment of the present invention, a gas pressure inside the first gas container may be measured in step (d) and be used as a gas pressure measured value inside the second gas container.

In addition, according to an embodiment of the present invention, the first gas container and the second gas container may be the same.

In addition, according to an embodiment of the present invention, only the component gas may be adsorbed inside the first gas container and the second gas container, and the balance gas may not be adsorbed inside the first gas container and the second gas container.

In addition, according to an embodiment of the present invention, the method for determining an amount of process gas may further include the steps of: (e) closing a gap between the first gas container and the second gas container and preparing a vacuum-state third gas container; (f) performing a second gas distribution by allowing the second gas container to communicate with the third gas container; and (g) measuring a gas pressure inside the third gas container, wherein the amount of the component gas adsorbed inside the gas container may be determined through a difference in the measured value of step (d) and a measured value of step (g).

In addition, according to an embodiment of the present invention, when the measured value of step (b) is $P_{d,gas,1}$ and the measured value of step (g) is $P_{g,gas,1}$, an amount $n_{A,loss,m,1}$ of the adsorbed component gas may be determined by formula (3)

$$\frac{1}{2} p_{d,gas,1} - p_{gd,gas,1} = \frac{1}{2} \frac{Z_A RT}{V_{cyl}} n_{A,loss,m,1}$$

($Z_A$ is a compression factor, R is the gas constant, T is a temperature, and $V_{cyl}$ is a gas container internal volume).

In addition, according to an embodiment of the present invention, when a manufacturing input amount of the component gas in step (a) is $n_{A,grav,m,0}$ and a manufacturing input amount of the balance gas is $n_{B,grav,m,0}$ in step (a), and a measured value of molar fraction of the component gas in step (g) is $x_{A,gas,gd,1}$, the amount $n_{A,loss,m,1}$ of loss of the component gas may be determined by formula (4)

$$n_{A,loss,m,1} = \left(\frac{1}{2}\right)^2 \left(n_{A,grav,m,0} - \frac{n_{B,grav,m,0} x_{A,gas,gd,1}}{1 - x_{A,gas,gd,1}}\right).$$

In addition, according to an embodiment of the present invention, the method for determining an amount of process gas may further include the steps of, in a case in which i times of gas pressure distributions are performed by using i+1 gas containers: (h) closing a gap between an (i−1)th gas container and an ith container and preparing a vacuum-state (i+1)th gas container; (i) performing an ith gas pressure distribution by allowing the ith gas container to communicate with the (i+1)th gas container; and (j) measuring a gas pressure inside the (i+1)th gas container, wherein a difference between a gas pressure measured value of the ith gas container in step (h) and the gas pressure measured value of the (i+1)th gas container in step (j) may have a constant value of $$\frac{1}{2} \frac{Z_A RT}{V_{cyl}} n_{A,loss,m,1}$$

($Z_A$ is a compression factor, R is the gas constant, T is a temperature, and $V_{cyl}$ is a gas container internal volume).

In addition, according to an embodiment of the present invention, after performing the first-stage gas pressure split, a mole fraction $x_{A,gas,d,1}$ of the component gas inside the second gas container may be calculated by formula (5)

$$x_{A,gas,d,1} = \frac{\frac{1}{2} n_{A,grav,m,0} - n_{A,loss,m,1}}{\frac{1}{2} n_{A,grav,m,0} - n_{A,loss,m,1} + \frac{1}{2} n_{B,grav,m,0}}$$

($n_{A,grav,m,0}$ is an amount (mol) of the component gas injected into the first gas container, and $n_{B,grv,m,0}$ is an amount (mol) of the balance gas injected into the first gas container in step (a)).

In addition, according to an embodiment of the present invention, the method for determining an amount of process gas may further include a step of displaying, on a precise pressure measuring apparatus, whether a gas pressure equilibrium between the first gas container and the second gas container is completed between steps (c) and (d).

In addition, according to an embodiment of the present invention, the method for determining an amount of process gas may further include a step of displaying, on a precise pressure measuring apparatus, whether a temperature equilibrium between the first gas container and the second gas container is completed between steps (c) and (d).

Advantageous Effects

According to an embodiment of the present invention configured as such, there is an effect of determining the amount of process gas loss that may be lost due to adsorption into or reaction with the inside of a high-pressure gas.

In addition, according to an embodiment of the present invention, there is an effect of improving the stability and reliability of a process by reflecting the determined amount of process gas loss to the control of the flow rate of the process gas and minimizing an error in gas supply.

In addition, according to an embodiment of the present invention, there is an effect of providing a mathematical method for determining the amount of process gas loss due to a loss inside various equipment for injecting a process gas.

DESCRIPTION OF SYMBOLS

5: Evacuation system
6: Valve
10: Evacuated first gas container, first cylinder

11: First gas container in gravimetric filling state, first cylinder

12: First gas container after first gas pressure distribution process, first cylinder 20: Evacuated second gas container, second cylinder 21: Second gas container after first gas pressure distribution process, second cylinder 22: Second gas container after second gas pressure distribution process, second cylinder 30: Evacuated third gas container, third cylinder 31: Third gas container after second gas pressure distribution process, third cylinder

MODE FOR CARRYING OUT THE INVENTION

The detailed description of the invention to be provided later refers to the accompanying drawings which exemplarily illustrates a specific embodiment in which the invention may be carried out. These embodiments will be described in sufficient detail to enable those skilled in the art to practice the invention. It is to be understood that various embodiments of the present invention are different from each other but need not to be mutually exclusive. For example, a specific shape, a structure and characteristics disclosed in the present invention provided herein may be implemented in other embodiments without departing from the spirit and scope of the present invention in relation to one embodiment. In addition, it is to be understood that the position or arrangement of individual components in each disclosed embodiment may be modified without departing from the spirit and scope of the invention. Accordingly, the following detailed description is not intended to be taken as a restrictive sense, and the scope of the present invention is limited only by appended claims, when suitably described, along with the full scope of equivalents to which such claims are claimed. In the drawings, like reference numerals refer to the same or similar features throughout the several views, and lengths, areas, thickness and the shapes thereof may also be exaggerated for convenience.

Hereinafter, preferable embodiments of the present invention will be described in detail with reference to the accompanying drawings so as to enable a person skilled in the art to easily implement the present invention.

In the present specification, a "gas container" is a container including a high-pressure gas and is to be understood to have a concept including all of a cylinder, a chamber, a pipe, and the like. In addition, the gas container is not closed in a single shape and is to be understood that an interaction such as moving, receiving or the like of a gas inside can be performed by being connected to another gas container. In particular, for convenience of description in the present invention, a gas container is assumed to be a cylinder, but the cylinder is merely one embodiment and the shape of the gas container is not limited thereto.

A method for determining an amount of gas low inside a gas container is characterized by including: (a) filling a component gas and a balance gas into a second gas container 10; (b) measuring a gas pressure inside the first gas container 11; (c) allowing the first gas container 11 and a second gas container 20 having an evacuated inside to communicate and performing a first-stage gas pressure split; and (d) measuring a gas pressure inside the second gas container 21, wherein an amount of the component gas adsorbed inside the gas containers 11 and 21 is calculated through a difference between a measured value of step (b) and a measured value of step (d) and is determined as an amount of gas loss. Hereinafter, detailed description will be provided with reference to drawings.

Figure 1:
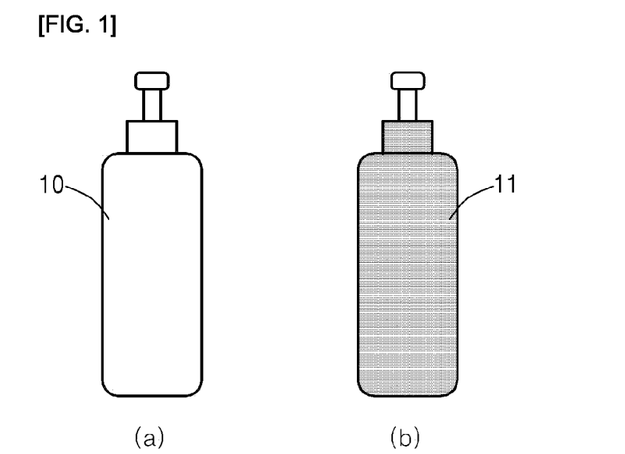
FIG. 1 is a schematic view illustrating the filling of a gas into a first gas container according to an embodiment of the present invention.

FIG. 1 is a schematic view showing the filling of a gas into a first gas container 10 according to an embodiment of the present invention. Hereinafter, in an embodiment, the first gas container 10 is described to be assumed as a first cylinder (mother cylinder 10) and the second gas container 20 as a second cylinder (daughter cylinder 20), and the third gas container 30 as third cylinder (grand-daughter cylinder 30).

As shown in (a) of FIG. 1, the first cylinder 10 which has a vacuum-state evacuated inside may first be prepared. In addition, as shown in (b) of FIG. 1, a component gas and a balance gas may be fully filled inside the first cylinder 10. The component gas and the balance gas may be filled with high enough pressure and thus may assume a heavy gas state, a liquid or solid state, a state in which three phases are partially present, or the like. That is, both the component gas and the balance gas may be understood to be gravitationally filled into the first cylinder 10. Hereinafter, this is referred to as gravimetric filling.

The component gas means a gas which is involved in an actual process and which may be lost inside the cylinder. For example, ethanol or the like may correspond to the component gas. The balance gas is a gas which is not involved in an actual process and is not lost inside the cylinder. For example, an inert gas such as $N_2$ or He may correspond to the balance gas.

Inside the first cylinder 11 filled with the component gas and the balance gas, the component gas may be adsorbed to an inner side surface of the first cylinder 11 or a small amount thereof may be lost by causing a reaction on the inner side surface. The component gas may be adsorbed to fine pores present on the inner surface of the first cylinder 11 or may be lost by causing a reaction with a trace amount of impurities contained in the inner surface.

An amount (mol) of gas excluding the lost gas among the gas filled into the first cylinder 11 by the gravimetric filling may be considered as the gas filled in an inner space of the first cylinder 11. This state is referred to as a pressure $P_{i,m,1}$ and a mole fraction $X_{i,m,1}$. The pressure of the gas filled in the inner space of the first cylinder 11 may be measured.

Figure 2:
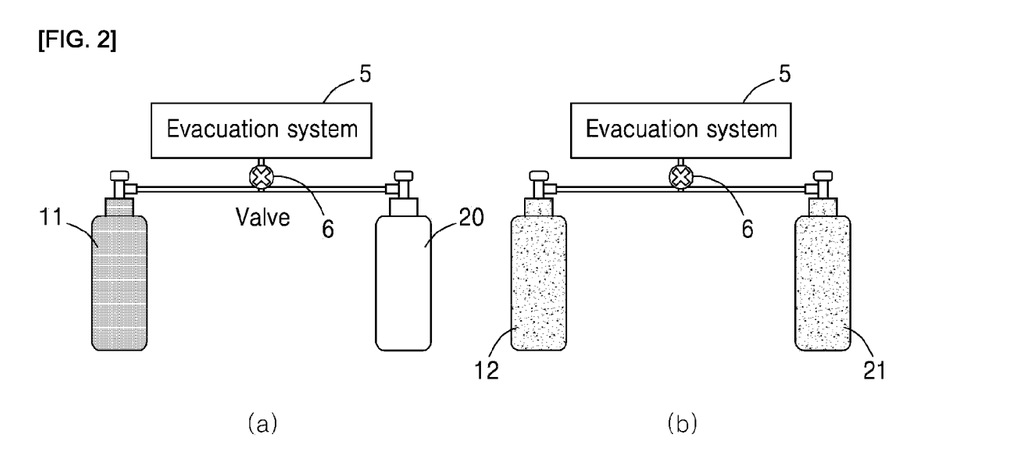
FIG. 2 is a schematic view illustrating that a first-stage gas pressure split is performed to the first gas container and the second gas container according to an embodiment of the present invention.

FIG. 2 is a schematic view illustrating that a first-stage gas pressure split is performed to a first gas container 11 and a second gas container 20 according to an embodiment of the present invention.

Referring to (a) of FIG. 2, a second cylinder 20 which has an evacuated inside may be connected to a first cylinder 11. The first cylinder 11 and the second cylinder 20 may favorably be the same in all aspects such as materials, shapes, sizes of internal spaces, strengths, and the like.

The first cylinder 11 and the second cylinder 20 are still in closed states in which gas cannot enter into and exit from each other. In this state, the first cylinder 11 has a pressure $P_{i,m,1}$ and a mole fraction $X_{i,m,1}$ and the second cylinder 20 has a pressure $P_{i,d,1}=0$ and a mole fraction $X_{i,d,1}=0$.

In a vacuum exhaust system 5 installed between the first cylinder 11 and the second cylinder 20, the gas in/out between the first cylinder 11 and the second cylinder 20 may be controlled by controlling a valve 6.

Referring to (b) of FIG. 2, the valve 6 is opened in the vacuum exhaust system 5 and allows the first cylinder 11 and the second cylinder 20 to communicate. When a sufficient time passes after the communication between the first cylinder 11 and the second cylinder 20, the gas pressures of both cylinders (or partial pressures of gas species) become the same. Hereinafter, this will be referred to as a "first-stage gas pressure split".

In order to determine whether the first-stage gas pressure split is completed, a precise pressure measuring apparatus (not shown) is interposed between the first cylinder 12 and the second cylinder 21 and whether a gas pressure equilibrium is completed may be measured and displayed. The precise pressure measuring apparatus may be configured to be connected with the vacuum exhaust system 5, and also configured to be included in the vacuum exhaust system 5.

In addition, since the temperatures of the first cylinder 12 and the second cylinder 21 may vary due to a pressure change, a precise temperature measuring apparatus (not shown) is interposed between the first cylinder 12 and the second cylinder 21, and whether a temperature equilibrium is completed may be measured and displayed. The precise temperature measuring apparatus may be configured to be connected with the vacuum exhaust system 5, and also configured to be included in the vacuum exhaust system 5.

Even though the gas pressure of the first cylinder 12 and the second cylinder 21 are the same after the communication, a small amount of gas may be lost because while the vacuum-state second cylinder 20 is filled with the gas from the first cylinder 11, the gas is adsorbed to the inner side surface of the second cylinder 20 or causes a reaction on the inner side surface.

The loss of gas may cause a result in which the partial pressure of the gas is lost. Accordingly, in this state, the first cylinder 12 has a pressure $P_{i,m,2} < 0.5 P_{i,m,1}$, and the second cylinder has a pressure $P_{i,d,2} < 0.5 P_{i,m,1}$. In addition, the mole fractions are the same: $X_{i,m,2} = X_{i,d,1} < X_{i,m,1}$. The pressure of the gas filled in the inner space of the second cylinder 21 may be measured. Alternatively, since the pressure of the gas filled in the internal space of the first cylinder 12 has the same value as that of the second cylinder 21, the pressure of the gas filled in the internal space of the first cylinder 12 may also be measured.

Next, the amount of the component gas adsorbed in each of the cylinders may be calculated through the difference between the pressure measured values $P_{i,m,1}$ and $P_{i,d,2}$ (or $P_{i,m,2}$). The amount of the component gas adsorbed may be determined by converting the difference between $P_{i,m,1}$ and $P_{i,d,2}$ (or $P_{i,m,2}$) into the number of moles of the component gas. In addition, the amount of adsorbed component gas may directly be determined as the amount of gas loss. A specific calculating method will be described later.

Meanwhile, the gas pressure distribution step is will be one step further performed as follows.

Figure 3:
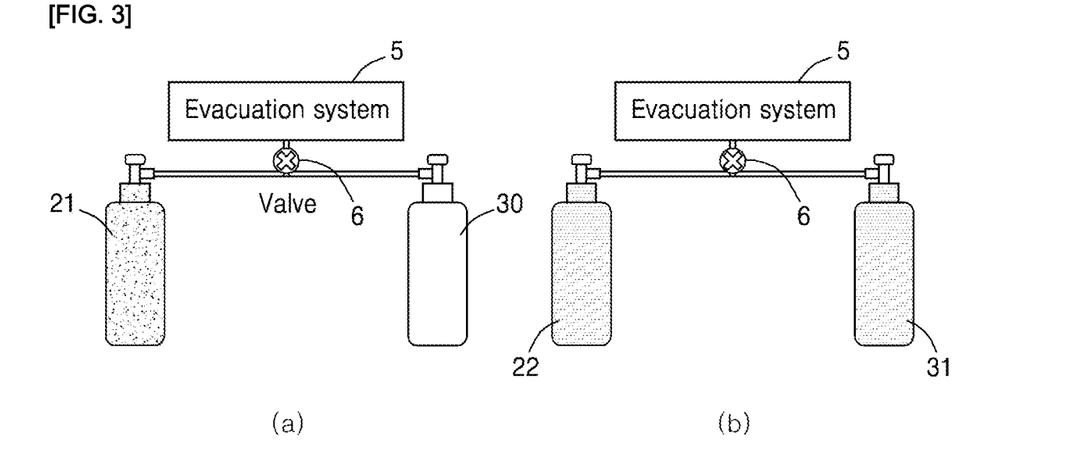
FIG. 3 is a schematic view illustrating that a second gas pressure distribution is performed to the first gas container and the second gas container according to an embodiment of the present invention.

FIG. 3 is a schematic view illustrating that a second-stage gas pressure split is performed to a second gas container 21 and a third gas container 30 according to an embodiment of the present invention.

Referring to (a) of FIG. 3, a first cylinder 12 and a second cylinder 21 may be closed for the second-stage gas pressure split, and a vacuum-state third cylinder 30 may be prepared. In addition, the third cylinder 30 having a vacuum inner state may be connected to the second cylinder 21. The second cylinder 21 and the third cylinder 30 may favorably be the same in all aspects such as materials, shapes, sizes of internal spaces, strengths, and the like.

The second cylinder 21 and the third cylinder 30 are still in closed states in which gas cannot enter into and exit from each other. In a vacuum exhaust system 5 installed between the second cylinder 21 and the third cylinder 30, the in/out of the gas between the second cylinder 21 and the third cylinder 30 may be controlled by controlling a valve 6.

Referring to (b) of FIG. 3, the valve 6 is opened in the vacuum exhaust system 5 and allows the second cylinder 21 and the third cylinder 30 to communicate. When a sufficient time passes after the communication between the first cylinder 21 and the third cylinder 30, the gas pressures of both cylinders (or partial pressures of gas species) become the same. Hereinafter, this will be referred to a "second gas pressure split".

Meanwhile, similar to FIGS. 2 and 3, the gas pressure split may further be performed. In this case, (n+1) cylinders 10, 20, 30, . . . are required, and the gas pressure splits may be performed n times. A specific calculating method will be described later.

Hereinafter, each step of the method for determining the amount of gas loss inside a cylinder will be described through formulas. Description will be provided to be divided into: (i) a gravimetric filling step into a first gas container 10; (ii) a first-stage gas pressure split process; (iii) a second-stage gas pressure split process; and (iv) an ith-stage second gas pressure split process.

Gravimetric Filling Step Into First Gas Container 10

First, as shown in (b) of FIG. 1, gravimetric filling of a binary gas mixture composed of a component gas A and a balance gas B is considered. If B is preserved and only A is substantially lost while filling a high-pressure gas, the amount (mol) of A in the gas phase of a first cylinder 10 is the same as the difference between the amount of A gravimetrically filled and the amount of A lost due to the adsorption and/or a reaction of A on the inner surface of the cylinder to be filled with the high-pressure gas. The mole balance formulas of A and B are respectively the same as formulas 1 and 2.

$$n_{A,grav,m,0} = n_{A,gas,m,0} + n_{A,loss,m,0} \quad \text{(formula 1)}$$

$$n_{A,gas,m,0} = n_{A,grav,m,0} - n_{A,loss,m,0} \quad \text{(formula 1')}$$

$$n_{B,grav,m,0} = n_{B,gas,m,0} + n_{B,loss,m,0} = n_{B,gas,m,0} \quad \text{(formula 2)}$$

Since B is preserved as a non-adsorbing material, $n_{B,loss,m,0} = 0$, and A is lost, $n_{A,loss,m,0}$ has a non-zero value. The mole fraction of the gas phase of A inside the gravimetrically filled first cylinder 10 is, $$x_{A,gas,m,0} = \frac{n_{A,gas,m,0}}{n_{A,gas,m,0} + n_{B,gas,m,0}} = \frac{n_{A,grav,m,0} - n_{A,loss,m,0}}{n_{A,grav,m,0} - n_{A,loss,m,0} + n_{B,grav,m,0}} \quad \text{(formula 3)}$$

A nominal gravimetric filling pressure is the sum of the nominal partial filling pressures of A and B.

$$p_{m,grav,0} = p_{A,grav,m,0} + p_{B,grav,m,0} \quad \text{(formula 4)}$$

While filling the evacuated first cylinder 10 with gases A and B, the loss of A shows a result of a loss in the partial pressure of gas A.

$$p_{A,grav,m,0} = p_{A,gas,m,0} + p_{A,loss,m,0} \quad \text{(formula 5)}$$

Therefore, the observed partial pressure of A is, $$p_{A,gas,m,0} = p_{A,grav,m,0} - p_{A,loss,m,0} \quad \text{(formula 6)}$$

When the above formulas are applied to the universal gas law PV=ZnRT, $$p_{A,gas,m,0} = p_{A,grav,m,0} - \frac{Z_A RT}{V_{cyl}} n_{A,loss,m,0} \quad \text{(formula 7)}$$

($Z_A$ is a compression factor, R is the gas constant, T is an absolute temperature, and $V_{cyl}$ is a cylinder internal volume)

The total pressure observed after the filling stage is, $$p_{gas,m,0} = p_{A,gas,m,0} + p_{B,gas,m,0} \quad \text{(formula 8)}$$

Here, B is preserved without loss during the filling stage, and the observed partial pressure of B is the same as the nominal gravimetric filling pressure. Thus, the following formula 9 is derived considering only the loss of A, and when arranging formula 9, formula 10 is obtained.

$$p_{gas,m,0} = p_{grav,m,0} - \frac{Z_A RT}{V_{cyl,m}} n_{A,loss,m,0} \quad \text{(formula 9)}$$

$$p_{grav,m,0} - p_{gas,m,0} = \frac{Z_A RT}{V_{cyl,m}} n_{A,loss,m,0} \quad \text{(formula 10)}$$

Therefore, the total gas pressure observed inside the first cylinder 11 after the filling stage is smaller than the nominal gravimetric filling pressure ($P_{m,gas,0} < P_{m,grav,0}$). The pressure loss at this stage is $$\frac{Z_A RT}{V_{cyl,m}} n_{A,loss,m,0}.$$

First-Stage Gas Pressure Split Process

As shown in (b) of FIG. 2, the mole fraction of A after the first-stage pressure split process is examined. The mole balance equation in the first-stage gas pressure split process is the same as formula 11.

$$(n_{A,gas,m,0} + n_{A,loss,m,0}) + (n_{A,gas,d,0} + n_{A,loss,d,0}) = (n_{A,gas,m,1} + n_{A,loss,m,1}) + (n_{A,gas,d,1} + n_{A,loss,d,1}) \quad \text{(formula 11)}$$

Before the first-stage gas split process (see (a) of FIG. 2), gas A is not present in a second cylinder (daughter cylinder) 20.

$$(n_{A,gas,d,0} = 0 \text{ and } n_{A,loss,d,0} = 0)(n_{A,grav,m,0} = n_{A,gas,m,0} + n_{A,loss,m,0} \quad \text{(formula 11')}$$

Therefore, the mole balance equation of A at this stage is the same as formula 12.

$$n_{A,grav,m,0} = (n_{A,gas,m,1} + n_{A,loss,m,1}) + (n_{A,gas,d,1} + n_{A,loss,d,1}) \quad \text{(formula 12)}$$

When adding the gas phase amount (mol) of A inside the first and second cylinders 12 and 21 (arranging formula 12), $$n_{A,gas,m,1} + n_{A,gas,d,1} = n_{A,grav,m,0} - n_{A,loss,m,1} - n_{A,loss,d,1} \quad \text{(formula 13)}$$

The gas phase amount of A inside the second cylinder 21 under a gas pressure equilibrium is the same as the gas phase amount of A in the first cylinder 12. ($n_{A,gas,d,1} = n_{A,gas,m,1}$)

$$n_{A,gas,d,1} = n_{A,gas,m,1} = \tfrac{1}{2}(n_{A,grav,m,0} - n_{A,loss,m,1} - n_{A,loss,d,1}) \quad \text{(formula 14)}$$

Subsequently, the amount of A is equally split between the first and second cylinders 12 and 21 under the assumption that the adsorption amounts of the first and second cylinders 12 and 21 are the same ($n_{A,loss,d,1} = n_{A,loss,m,1}$). When substituting this into formula 14 and arranging the result, $$n_{A,gas,d,1} = n_{A,gas,m,1} = \tfrac{1}{2}(n_{A,grav,m,0} - 2n_{A,loss,m,1}) \quad \text{(formula 15)}$$

$$n_{A,gas,d,1} = n_{A,gas,m,1} = \tfrac{1}{2}n_{A,grav,m,0} - n_{A,loss,m,1} \quad \text{(formula 15')}$$

In a similar manner, the mole balance equation of B in the first-stage gas pressure split process is the same as formula 16.

$$(n_{B,gas,m,0} + n_{B,loss,m,0}) + (n_{B,gas,d,0} + n_{B,loss,d,0}) = (n_{B,gas,m,1} + n_{B,loss,m,1}) + (n_{B,gas,d,1} + n_{B,loss,d,1}) \quad \text{(formula 16)}$$

Before the first-stage gas pressure split process (see (a) of FIG. 2), there is no B in the second cylinder ($n_{B,gas,d,0} = 0$ and $n_{B,loss,d,0} = 0$). If there is no loss of B on both the first and second cylinders 11 and 20, the mole balance equation of B in the first-stage gas pressure split process is the same as formula 17.

$$n_{B,grav,m,0} = n_{B,gas,m,0} = n_{B,gas,m,1} + n_{B,gas,d,1} \quad \text{(formula 17)}$$

Subsequently, the amount of B is equally split between the first and second cylinders 11 and 20. When arranging formula 17, $$n_{B,gas,d,1} = n_{B,gas,m,1} = \tfrac{1}{2}n_{B,grav,m,0} \quad \text{(formula 18)}$$

Consequently, the gas phase mole fraction of A inside the second cylinder 21 after the first-stage gas pressure split process is, $$x_{A,gas,d,1} = \frac{n_{A,gas,d,1}}{n_{A,gas,d,1} + n_{B,gas,d,1}} \quad \text{(formula 19)}$$

Substituting formulas 15 and 18 into formula 19, $$x_{A,gas,d,1} = \frac{\tfrac{1}{2}n_{A,grav,m,0} - n_{A,loss,m,1}}{\tfrac{1}{2}n_{A,grav,m,0} - n_{A,loss,m,1} + \tfrac{1}{2}n_{B,grav,m,0}} \quad \text{(formula 20)}$$

The mole fractions of A on both the first and second cylinders 12 and 21 are equal to each other ($x_{A,gas,m,1} = x_{A,gas,d,1}$).

Next, the gas pressure balance relationship of the first-stage gas pressure split process is $$p_{m,gas,0} + p_{d,gas,0} > p_{m,gas,1} + p_{d,gas,1} \quad \text{(formula 21)}$$

A gas mixture $P_{m,gas,0}$ inside the first cylinder 11 voluntarily moves to the vacuum-state second cylinder 20 ($P_{d,0} = 0$) due to a pressure gradient ($p_{m,gas,0} - p_{d,0} = p_{m,gas,0}$) between the two cylinders 11 and 20 until a gas pressure equilibrium ($p_{m,gas,1} = p_{d,gas,o}$) is reached.

$$p_{m,gas,0} > p_{m,gas,1} + p_{d,gas,1} \quad \text{(formula 22)}$$

When the first-stage gas pressure split process is completed, the gas pressures inside both the cylinders 12 and 21 are the same ($p_{m,gas,1} = p_{d,gas,1}$). When arranging formula 22, $$p_{d,gas,1} = p_{m,gas,1} < \tfrac{1}{2} p_{m,gas,0} \quad \text{(formula 23)}$$

The left side of formula 23 is arranged as formula 24.

$$p_{d,gas,1} = p_{m,gas,1} = \tfrac{1}{2}\left(p_{grav,m,0} - 2\frac{Z_A RT}{V_{cyl}} n_{A,loss,m,0}\right) = \quad \text{(formula 24)}$$

$$\tfrac{1}{2} p_{grav,m,0} - \frac{Z_A RT}{V_{cyl}} n_{A,loss,m,0} \therefore p_{d,gas,1} =$$

$$\tfrac{1}{2}\left(p_{grav,m,0} - 2\frac{Z_A RT}{V_{cyl}} n_{A,loss,m,0}\right)$$

The middle term of formula 24 may be derived as follows.

$$P_{m,gas,1} + P_{d,gas,1} =$$

$$P_{m,gas,0} - \frac{Z_A RT}{V_{cyl}} n_{A,loss,d,0} = P_{grav,m,0} - \frac{Z_A RT}{V_{cyl,m}} n_{A,loss,m,0} - \frac{Z_A RT}{V_{cyl,d}} n_{A,loss,d,0}$$

$$n_{A,loss,m,0} = n_{A,loss,d,0} \text{ and } V_{cyl,m} = V_{cyl,d} = V_{cyl}.$$

The right side of formula 23 is arranged as formula 25.

$$\frac{1}{2} P_{m,gas,0} = \frac{1}{2}\left(P_{grav,m,0} - \frac{Z_A RT}{V_{cyl}} n_{A,loss,m,0}\right) = \frac{1}{2} P_{grav,m,0} - \frac{1}{2}\frac{Z_A RT}{V_{cyl}} n_{A,loss,m,0} \quad \text{(formula 25)}$$

($Z_A$ is a compression factor, R is the gas constant, T is an absolute temperature, and $V_{cyl}$ is a cylinder internal volume)

Therefore, the pressure in the first-stage gas pressure split process is, $$\frac{1}{2} P_{m,gas,0} - P_{d,gas,1} = \frac{1}{2}\frac{Z_A RT}{V_{cyl}} n_{A,loss,m,0} \quad \text{(formula 26)}$$

Meanwhile, when the resolution of a precise manometer is of such a level that is difficult to measure the loss amount, the gas mole fraction value measured by using a gas analyzer is used rather than the directly calculated amount of gas loss, and when the input mole information manufactured by a gravimetric method is used, the amount of gas loss may be determined. Referring again to formula 20, $$x_{A,gas,d,1} = \frac{\frac{1}{2} n_{A,grav,m,0} - n_{A,loss,m,1}}{\frac{1}{2} n_{A,grav,m,0} - n_{A,loss,m,1} + \frac{1}{2} n_{B,grav,m,0}} \quad \text{(formula 20)}$$

$x_{A,gas,d,1}$ is a analysis measurement value, $n_{A,grav,m,0}$ is an amount of manufacturing input for component B, and $n_{B,grav,m,0}$ is an amount of manufacturing input for component B. The analysis measurement value (mole fraction) $y_d = x_{A,gas,d,1}$ ($0 < y_d < 1$) is analyzed and measured, thereby determining the amount of gas loss.

When representing $A = n_{A,grav,m,0}$, $B = n_{B,grav,m,0}$, and $x = n_{A,loss,m,1}$, formula 20 is, $$y_d = \frac{\frac{1}{2}A - x}{\frac{1}{2}A - x + \frac{1}{2}B} \rightarrow \left\{\frac{1}{2}(A+B) - x\right\} y_d = \frac{1}{2}A - x \rightarrow x(1 - y_d) = \frac{1}{2}A - \frac{1}{2}(A+B)y_d \quad \text{(formula 20')}$$

$$\therefore x = \frac{1}{2}\left\{\frac{(A - Ay_d - By_d)}{1 - y_d}\right\} = \frac{1}{2}\left(A - \frac{By_d}{1 - y_d}\right) \quad \text{(formula 20")}$$

$$\therefore n_{A,loss,m,1} = \frac{1}{2}\left(n_{A,grav,m,0} - \frac{n_{B,grav,m,0} x_{A,gas,d,1}}{1 - x_{A,gas,d,1}}\right)$$

Second-Stage Gas Pressure Split Process

As shown in (b) of FIG. 3, after the second-stage pressure split process, the mole fraction of A inside a third cylinder 31 is examined. The mole balance equation of A in the second-stage gas pressure split process is the same as formula 27.

$$(n_{A,gas,d,1} + n_{A,loss,d,1}) + (n_{A,gas,gd,0} + n_{A,loss,gd,0}) = (n_{A,gas,d,2} + n_{A,loss,d,2}) + (n_{A,gas,gd,1} + n_{A,loss,gd,1}) \quad \text{(formula 27)}$$

Before the second-stage gas split process (see (a) of FIG. 3), gas A is not present in the third cylinder (grand-daughter cylinder) 30. ($n_{A,gas,gd,0} = 0$ and $n_{A,loss,gd,0} 0$)( $$(n_{A,gas,d,1} + n_{A,loss,d,1}) = (n_{A,gas,d,2} + n_{A,loss,d,2}) + (n_{A,gas,gd,1} + n_{A,loss,gd,1}) \quad \text{(formula 28)}$$

After the second-stage gas pressure split process, the amount of A is evenly distributed between the second and third cylinders 22 and 31 ($n_{A,gd,1} = n_{A,d,1}$). Furthermore, the loss amount of A inside the second cylinder 22 is the same as the loss amount inside the third cylinder 31 ($n_{A,loss,d,2} = n_{A,loss,gd,1}$). When arranging formula 28, $$(n_{A,gas,d,2} + n_{A,loss,d,2}) = (n_{A,gas,gd,1} + n_{A,loss,gd,1}) \quad \text{(formula 29)}$$

The mole balance equation of A in the gas pressure split process is (substitute formula 28 into formula 29) is, $$(n_{A,gas,d,1} + n_{A,loss,d,1}) = 2(n_{A,gas,gd,1} + n_{A,loss,gd,1}) \quad \text{(formula 30)}$$

The total amount of A inside the third cylinder 31 (arranging formula 30) is, $$n_{A,gd,1} = n_{A,gas,gd,1} + n_{A,loss,gd,1} = \frac{1}{2}(n_{A,gas,d,1} + n_{A,loss,d,1}) \quad \text{(formula 30')}$$

$$n_{A,gas,gd,1} = \frac{1}{2}(n_{A,gas,d,1} + n_{A,loss,d,1}) - n_{A,loss,gd,1} \quad \text{(formula 30")}$$

When substituting formula 15 into formula 30" and arranging the result, $$n_{A,gas,gd,1} = \frac{1}{2}\{\frac{1}{2}(n_{A,grav,m,0} - 2n_{A,loss,m,1}) + n_{A,loss,d,1}\} - n_{a,loss,gd,1} \quad \text{(formula 31)}$$

Since the loss amounts of A in the first, second, and third cylinders 11, 21 and 31 are the same ($n_{A,loss,m,1} = n_{A,loss,d,1} = n_{A,loss,gd,1}$) (arranging formula 31), $$n_{A,gas,gd,1} = \left(\frac{1}{2}\right)^2 n_{A,grav,m,0} - n_{A,loss,m,1} \quad \text{(formula 32)}$$

Consequently, the gas phase mole fraction of A inside the third cylinder 31 after the second-stage gas pressure split process is, $$x_{A,gas,gd,1} = \frac{n_{A,gas,gd,1}}{n_{A,gas,gd,1} + n_{B,gas,gd,1}} \quad \text{(formula 33)}$$

Substituting formulas 18 and 32 into formula 33, $$x_{A,gas,gd,1} = \frac{\left(\frac{1}{2}\right)^2 n_{A,grav,m,0} - n_{A,loss,m,1}}{\left(\frac{1}{2}\right)^2 n_{A,grav,m,0} - n_{A,loss,m,1} + \left(\frac{1}{2}\right)^2 n_{B,grav,m,0}} \quad \text{(formula 34)}$$

The mole fractions of A on both the second and third cylinders 22 and 31 are equal to each other ($x_{A,gas,d,2} = x_{A,gas,gd,1}$).

The gas pressure balance relationship in the second-stage gas pressure split process may be similar to the first-stage gas pressure split process except for a difference that the gas mixture $P_{d,1}$ voluntarily moves to the third cylinder 30

($P_{gd,0}=0$) inside the second cylinder 21 due to a pressure gradient. When the gas pressure split process is completed, $$p_{d,1}+p_{gd,0}>p_{d,2}+p_{gd,1} \quad \text{(formula 35)}$$

$$p_{d,1}>p_{d,2}+p_{gd,1} \quad \text{(formula 35')}$$

When arranging formula 35', $$p_{gd,1}=p_{d,2}<\tfrac{1}{2}p_{d,1} \quad \text{(formula 36)}$$

The left side of formula 36 is arranged as formula 37.

$$p_{gd,1} = p_{d,2} = \left(\frac{1}{2}\right)^2 p_{A,grav,m,0} - p_{A,loss,m,1} \quad \text{(formula 37)}$$

The right side of formula 36 is arranged as formula 38.

$$\frac{1}{2}p_{d,1} = \frac{1}{2}\left(\frac{1}{2}p_{grav,m,0} - \frac{Z_A RT}{V_{cyl}}n_{A,loss,m,1}\right) = \quad \text{(formula 38)}$$

$$\left(\frac{1}{2}\right)^2 p_{grav,m,0} - \frac{1}{2}\frac{Z_A RT}{V_{cyl}}n_{A,loss,m,1}$$

Therefore, the pressure loss (formula 38-formula 39) in the first-stage gas pressure split process is, $$\frac{1}{2}p_{d,1} - p_{gd,1} = \frac{1}{2}\frac{Z_A RT}{V_{cyl}}n_{A,loss,m,1}$$

The pressure loss $$\left(\frac{1}{2}\frac{Z_A RT}{V_{cyl}}n_{A,loss,m,1}\right)$$

in the second-stage gas pressure split process is the same as the pressure loss in the first-stage gas pressure split process.

Meanwhile, when the resolution of a precise manometer is of such a level that is difficult to measure the loss amount, the gas mole fraction value measured by using a gas analyzer is used rather than the directly calculated amount of gas loss, and when the input mole information manufactured by a gravimetric method is used, the amount of gas loss may be determined. Referring again to formula 34, $$x_{A,gas,gd,1} = \frac{\left(\frac{1}{2}\right)^2 n_{A,grav,m,0} - n_{A,loss,m,1}}{\left(\frac{1}{2}\right)^2 n_{A,grav,m,0} - n_{A,loss,m,1} + \left(\frac{1}{2}\right)^2 n_{B,grav,m,0}} \quad \text{(formula 34)}$$

The analysis measurement value (mole fraction) $y_{gd}=x_{A,gas,d,1}$ ($0<y_{gd}<1$) is analyzed and measured, thereby determining the amount of gas loss.

When representing $A=n_{A,grav,m,0}$, $B=n_{B,grav,m,0}$, and $x=n_{A,loss,m,1}$, formula 34 is $$y_{gd} = \frac{\left(\frac{1}{2}\right)^2 A - x}{\left(\frac{1}{2}\right)^2 A - x + \left(\frac{1}{2}\right)^2 B} \rightarrow \left\{\left(\frac{1}{2}\right)^2 (A+B) - x\right\}y_{gd} = \quad \text{(formula 34')}$$

$$\left(\frac{1}{2}\right)^2 A - x \rightarrow x(1-y_{gd}) = \left(\frac{1}{2}\right)^2 A - \left(\frac{1}{2}\right)^2 (A+B)y_{gd}$$

-continued $$\therefore x = \left(\frac{1}{2}\right)^2 \left\{\frac{(A - Ay_{gd} - By_{gd})}{1-y_{gd}}\right\} = \left(\frac{1}{2}\right)^2 \left(A - \frac{By_{gd}}{1-y_{gd}}\right) \quad \text{(formula 34'')}$$

$$\therefore n_{A,loss,m,1} = \left(\frac{1}{2}\right)^2 \left(n_{A,grav,m,0} - \frac{n_{B,grav,m,0}x_{A,gas,gd,1}}{1-x_{A,gas,gd,1}}\right)$$

Since formula 20'=formula 34', $$x = \frac{1}{2}\left(A - \frac{By_d}{1-y_d}\right) = \left(\frac{1}{2}\right)^2 \left(A - \frac{By_{gd}}{1-y_{gd}}\right) \quad \text{(formula 40)}$$

$$-> A - \frac{By_d}{1-y_d} = \frac{1}{2}A - \frac{1}{2}\frac{By_{gd}}{1-y_{gd}}$$

$$-> A = B\left(\frac{2y_d}{1-y_d} - \frac{y_{gd}}{1-y_{gd}}\right)$$

$$\frac{A}{B} = \frac{2y_d}{1-y_d} - \frac{y_{gd}}{1-y_{gd}}$$

$$0 < y_d < 1,\ 0 < y_{gd} < 1,\ \text{and}\ y_{gd} < y_d \quad \text{(formula 41)}$$

When formulas 40 and 41 are satisfied, $x=n_{A,loss,m,1}$ may be obtained by using either of formula 20' or formula 34'.

On the other hand, loss rates (%) as well as loss amounts may be calculated.

(1) The loss rate in the gravimetric filling stage inside the first cylinder 10 is, $$\text{Loss rate (\%)} = 1 - \frac{x_{A,gas,m,1}}{x_{A,grav,m,0}} \times 100 \quad \text{(formula 42)}$$

(2) The loss rate in the first gas pressure split process is, $$\text{Loss rate (\%)} = 1 - \frac{x_{A,gas,d,1}}{x_{A,grav,m,1}} \times 100 \quad \text{(formula 43)}$$

(3) The loss rate in the second gas pressure split process is, $$\text{Loss rate (\%)} = 1 - \frac{x_{A,gas,gd,1}}{x_{A,grav,d,1}} \times 100 \quad \text{(formula 44)}$$

ith-Stage Second Gas Pressure Split Process

Consequently, the gas pressure balance and mole balance equation may respectively be generalized in the ith-stage gas pressure split process of A and B.

$$x_{A,gas,i,1} = \frac{\left(\frac{1}{2}\right)^i n_{A,grav,m,0} - n_{A,loss,m,1}}{\left(\frac{1}{2}\right)^i n_{A,grav,m,0} - n_{A,loss,m,1} + \left(\frac{1}{2}\right)^i n_{B,grav,m,0}} \quad \text{(formula 45)}$$

where $i = 1, 2, 3$

The gas pressure balance equation in the ith-stage gas pressure split process may generalize the fact that the gas mixture $P_{i-1}$ inside a supply cylinder may voluntarily move toward a vacuum-state cylinder $p_{i,o}=0$. When this gas pressure split process is completed, $$p_{i-1,1} + p_{i,0} > p_{i-1,2} + p_{i,1} \quad \text{(formula 46)}$$

$$p_{i-1,1} > p_{i-1,2} + p_{i,1} \quad \text{(formula 46')}$$

When arranging formula 46'.

$$p_{i,1} = p_{i-1,2} < \tfrac{1}{2} p_{i-1,1} \quad \text{(formula 47)}$$

The left side of formula 47 is arranged as formula 48.

$$p_{i,1} = p_{i-1,2} = \left(\tfrac{1}{2}\right)^i p_{A,grav,m,0} - \frac{Z_A RT}{V_{cyl}} n_{A,loss,m,1} \quad \text{(formula 48)}$$

The right side of formula 47 is arranged as formula 49.

$$\tfrac{1}{2} p_{i-1,1} = \tfrac{1}{2}\left\{\left(\tfrac{1}{2}\right)^{i-1} p_{A,grav,m,0} - p_{A,loss,m,1}\right\} = \left(\tfrac{1}{2}\right)^i p_{grav,m,0} - \tfrac{1}{2}\frac{Z_A RT}{V_{cyl}} n_{A,loss,m,1} \quad \text{(formula 49)}$$

The pressure loss (formula 49-formula 48) in the ith-stage gas pressure split process is, $$\tfrac{1}{2} p_{i-1,1} - p_{i,1} = \tfrac{1}{2}\frac{Z_A RT}{V_{cyl}} n_{A,loss,m,1} \quad \text{(formula 50)}$$

Therefore, the total pressure loss due to the loss of A in a vacuum-state cylinder in each process has a constant value of $$\left(\tfrac{1}{2}\frac{Z_A RT}{V_{cyl}} n_{A,loss,m,1}\right).$$

As described above, the present invention may determine a process gas loss that may be lost due to adsorption to or reaction with the inside of a high-pressure gas container. In addition, there is an effect of improving the stability and reliability of a process by reflecting the determined amount of process gas loss to the control of the flow rate of the process gas and by minimizing an error in gas supply.

The present invention has been illustrated and described with respect to preferred embodiments as described above, various modifications and changes are possible by a person skilled in the art to which the present invention belongs without departing from the spirit of the present invention, which is not limited to the above embodiments. Such modifications and changes should be construed to fall within the scope of the invention and the appended claims.

The invention claimed is:

1. A method for determining a process gas loss in a gas container, the method comprising the steps of:
   (a) filling a component gas and a balance gas into a first gas container;
   (b) measuring a gas pressure inside the first gas container;
   (c) performing a first gas pressure distribution by allowing the first gas container to communicate with a second gas container having an evacuated inside; and
   (d) measuring a gas pressure inside the second gas container, wherein
   an amount of the component gas adsorbed inside the first and second gas containers is calculated through a difference between a measured value of step (b) and a measured value of step (d) and is determined as an amount of gas loss,
   wherein
   only the component gas is adsorbed inside the first gas container and the second gas container, and
   the balance gas is not adsorbed inside the first gas container and the second gas container.

2. The method of claim 1, wherein
the amount of the component gas adsorbed inside the first and second gas containers is determined by converting the difference between the pressure values measured in steps (b) and (c) into the number of moles of the component gas.

3. The method of claim 2, wherein
when the measured value of step (b) is $P_{m,gas,0}$, and the measured value of step (d) is $P_{d,gas,1}$, an amount $n_{A,loss,m,0}$ of the adsorbed component gas is determined from formula (1)

$$\tfrac{1}{2} P_{m,gas,0} - P_{d,gas,1} = \tfrac{1}{2}\frac{Z_A RT}{V_{cyl}} n_{A,loss,m,0}$$

($Z_A$ is a compression factor, R is the gas constant, T is a temperature, and $V_{cyl}$ is a gas container internal volume).

4. The method of claim 1, wherein
when a manufacturing input amount of the component gas in step (a) is $n_{A,grav,m,0}$, and a manufacturing input amount of the balance gas is in step (a) is $n_{B,grav,m,0}$, and a measured value of molar fraction of the component gas in step (d) is $X_{A,gas,d,1}$, the amount of loss $n_{A,loss,m,1}$ of the component gas is determined by formula (2)

$$n_{A,loss,m,1} = \tfrac{1}{2}\left(n_{A,grav,m,0} - \frac{n_{B,grav,m,0} X_{A,gas,d,1}}{1 - X_{A,gas,d,1}}\right).$$

5. The method of claim 2, wherein a pressure loss value exhibited by the adsorption of the component gas inside the first gas container in step (b) is two times a pressure loss value exhibited by the adsorption inside the first gas container and the second gas container after performing the first gas pressure distribution in step (d).

6. The method of claim 1, wherein
a gas pressure inside the first gas container is measured in step (d) and used as a gas pressure measured value inside the second gas container.

7. The method of claim 1, wherein
the first gas container and the second gas container are the same.

8. The method of claim 1, further comprising the steps of:
   (e) closing a gap between the first gas container and the second gas container and preparing a vacuum-state third gas container;
   (f) performing a second gas distribution by allowing the second gas container to communicate with the third gas container; and
   (g) measuring a gas pressure inside the third gas container, wherein
   the amount of the component gas adsorbed inside the first and second gas containers may be determined through a difference in the measured value of step (d) and a measured value of step (g).

9. The method of claim 8, wherein
when the measured value of step (b) is $P_{m,gas,0}$, and the measured value of step (d) is $P_{d,gas,1}$, an amount $n_{A,loss,m,0}$ of the adsorbed component gas is determined from formula (3)

$$\frac{1}{2} p_{d,gas,1} - p_{gd,gas,1} = \frac{1}{2} \frac{Z_A RT}{V_{cyl}} n_{A,loss,m,1}$$

($Z_A$ is a compression factor, R is the gas constant, T is a temperature, and $V_{cyl}$ is a gas container internal volume).

10. The method of claim 8, wherein
when a manufacturing input amount of the component gas step (a) is $n_{A,grav,m,0}$, and a manufacturing input amount of the balance gas is in step (a) is $n_{B,grav,m,0}$, and a measured value of molar fraction of the component gas in step (d) is $x_{A,gas,gd,1}$, the amount of loss $n_{A,loss,m,1}$ of the component gas is determined by formula (4)

$$n_{A,loss,m,1} = \left(\frac{1}{2}\right)^2 \left( n_{A,grav,m,0} - \frac{n_{B,grav,m,0} x_{A,gas,gd,1}}{1 - x_{A,gas,gd,1}} \right).$$

11. The method of claim 8, further comprising the steps of,
in a case in which i times of gas pressure distributions are performed by using i+1 gas containers:
(h) closing a gap between an (i−1)th gas container and an ith container and preparing a vacuum-state (i+1)th gas container;
(i) performing an ith gas pressure distribution by allowing the ith gas container to communicate with the (i+1)th gas container; and
(j) measuring a gas pressure inside the (i+1)th gas container, wherein
a difference between a gas pressure measured value of the ith gas container in step (h) and the gas pressure measured value of the (i+1)th gas container in step (j) has a constant value of $$\frac{1}{2} \frac{Z_A RT}{V_{cyl}} n_{A,loss,m,1}$$

($Z_A$ is a compression factor, R is the gas constant, T is a temperature, and $V_{cyl}$ is a gas container internal volume).

12. The method of claim 1, wherein
after performing the first gas pressure distribution, a mole fraction $X_{A,gas,d,1}$ of the component gas inside the second gas container is calculated by formula (5)

$$x_{A,gas,d,1} = \frac{\frac{1}{2} n_{A,grav,m,0} - n_{A,loss,m,1}}{\frac{1}{2} n_{A,grav,m,0} - n_{A,loss,m,1} + \frac{1}{2} n_{B,grav,m,0}}$$

[$n_{A,grav,m,0}$ is an amount (mol) of the component gas injected into the first gas container, and $n_{B,grv,m,0}$ is an amount (mol) of the balance gas injected into the first gas container in step (a)].

13. The method of claim 1, further comprising a step of displaying, on a precise pressure measuring apparatus, whether a gas pressure equilibrium between the first gas container and the second gas container is completed between steps (c) and (d).

14. The method of claim 1, further comprising a step of displaying, on a precise pressure measuring apparatus, whether a temperature equilibrium between the first gas container and the second gas container is completed between steps (c) and (d).

* * * * *